United States Patent Office
3,524,701
Patented Aug. 18, 1970

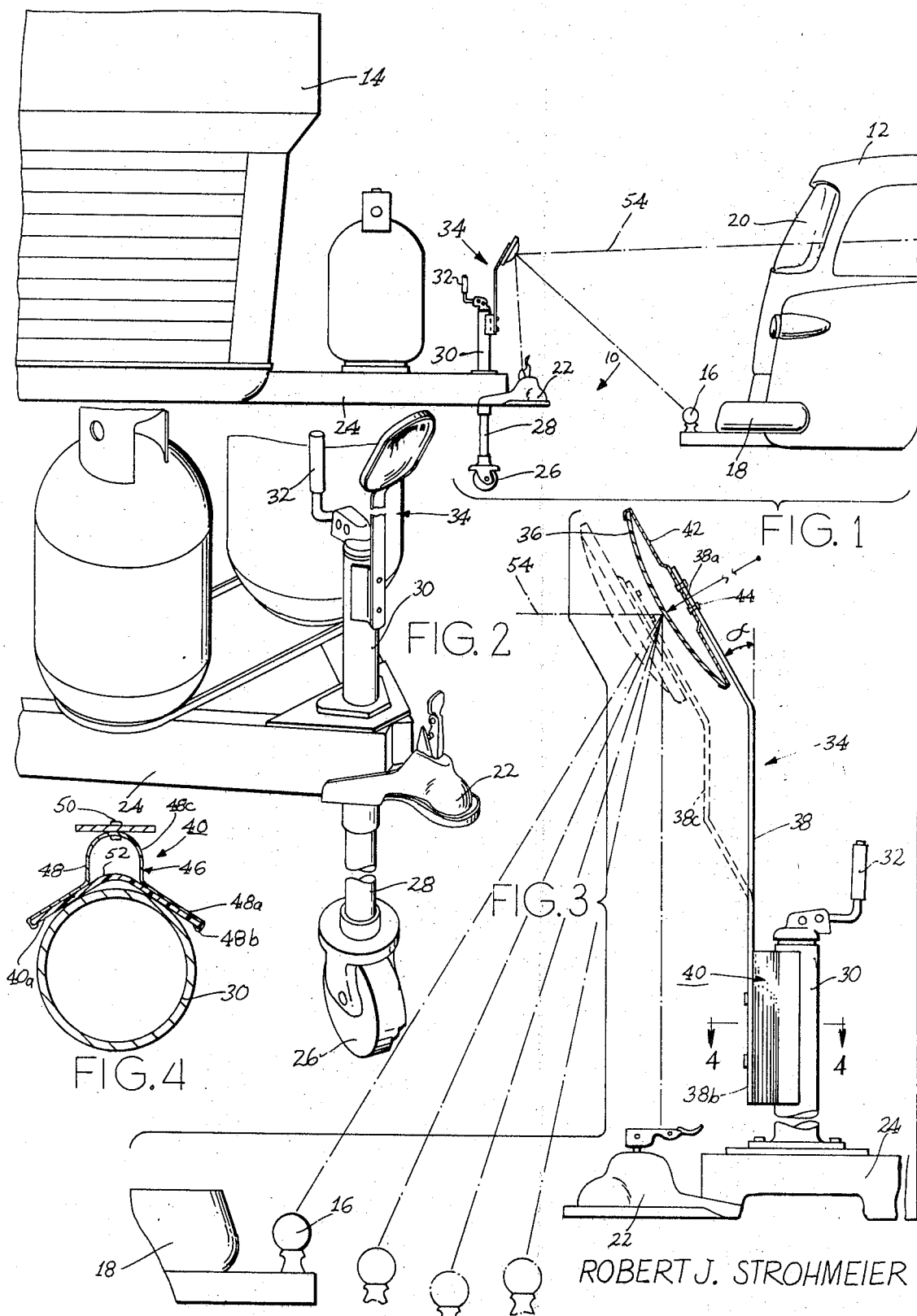

3,524,701
TRAILER HITCH VIEWING MIRROR ASSEMBLY
FOR MOUNTING ON A TRAILER JACK POST
Robert J. Strohmeier, 5541 Bridgetown Road,
Cincinnati, Ohio 45211
Filed Jan. 13, 1969, Ser. No. 790,613
Int. Cl. G02b 5/06
U.S. Cl. 350—307         6 Claims

ABSTRACT OF THE DISCLOSURE

A trailer hitch viewing mirror assembly for mounting on a trailer jack post to provide the driver of a driven vehicle with a means of visibly and accurately aligning and positioning that portion of a trailer hitch apparatus on the rear of the driven vehicle with that portion of the trailer hitch apparatus on the front of a trailer vehicle in the absence of any other person or device.

BACKGROUND OF THE INVENTION

Field of the Invention

The invention relates to an improved trailer hitch guide mirror to provide the driver of a driven vehicle with a means for aligning and positioning the interlocking portions of a trailer hitch apparatus so that they may be placed in engagement.

Description of the prior art

There have been a number of ingenious prior art devices which have been developed to aid the driver of a driven vehicle such as a car or truck to connect therewith a trailer or similar wheeled vehicle. The trailer hitch apparatus which connects such vehicles generally includes a first engageable portion secured to the rear bumper or the frame of a driven vehicle and a second engagable portion secured to the front towbar or tongue of the trailer vehicle. Due to the fact that the first engageable portion of the trailer hitch apparatus is located near the lower rear portion of the driven vehicle, it is generally impossible for the driver of the driven vehicle to observe the trailer hitch apparatus when the two engageable portions therof are interconnected. This, of course, is a distinctive disadvantage during the actual coupling operation. For example, in practice the driver of the driven vehicle may usually observe the second engageable portion of the trailer hitch apparatus on the trailer vehicle as he starts to back the driven vehicle into position while still a considerable distance away from the trailer vehicle. Accordingly, the two two engageable portions of the trailer hitch apparatus may be brought into approximate alignment. However, as the driven vehicle approaches the trailer vehicle, the driver's view of the trailer hitch apparatus is obscured by the rear portion of the driven vehicle. Thus, the driver of the driven vehicle must speculate concerning the alignment and positioning of the trailer htich apparatus. Such speculation frequently leads to numerous back and forth attempts by the driver of the driven vehicle to satisfactorily align and position the engageable portions of the trailer hitch apparatus. If a second person is available to aid the driver of the driven vehicle in this procedure, the back and forth movement of the driven vehicle may be minimized. However, the basic problem is still present.

In many instances, the driver is able to make the final connection of the two engageable portions of the trailer hitch apparatus by moving the trailer tongue by hand. However, if the trailer vehicle is loaded or is of a heavy type, such as, for example, a house trailer, it is impossible to make any adjustments by movement of the trailer vehicle. Accordingly, the only way to couple the trailer vehicle is to obtain exact alignment and positioning of the two engageable portions of the trailer hitch apparatus by aligning and positioning the driven vehicle.

As previously indicated, a number of prior art expedients have been developed to aid in eliminating the aforementioned problem. However, these expedients have proven to be unsatisfactory in a number of respects.

United States Letters Pat. No. 3,332,731, in the name of C. J. Penk, is exemplary of such prior art expedients. There a reflecting mirror is mounted on a trailer vehicle and positioned such that a driver in the driven vehicle may view the trailer hitch apparatus during the coupling procedure. Such a mirror is generally satisfactory for certain types of trailers, but is undesirable for house trailers and the like having front windows, etc. Additionally such a reflecting mirror would not provide the proper visual observation of the trailer hitch apparatus when used with conventional house trailers because such trailers are provided with large tanks and the like which are mounted on the towbar or tongue of the trailer.

An additional patent of interest is United States Letters Pat. No. 3,295,914, in the name of W. Dietrich, which discloses a hitch guide mirror for mounting on a trailer jack post. While this mirror has been generally satisfactory, it still has failed to solve a number of problems More particularly, it is difficult to change the vertical adjustment of this mirror because mechanical relocation is required. It is also necessary for additional parts or devices to be permanently attached to the trailer jack post. Further, the hitch mirror of this invention also does not universally fit the trailer jack posts of most trailers. For example, the hitch mirror is not adjustable to pass on obstruction located at the top of the jack post, such as electric jack post motors, winches or other devices which may be utilized to raise and lower the front end of the trailer vehicle. Still another problem is that the flat mirror surface used only provides a very limited view of the trailer hitch apparatus, occuring when the engageable portion thereof on the driven and trailer vehicles reach a point nearly at hitch position. The driver of the driven vehicle is therefor not provided with ample distance in which to maneuver the driven vehicle so as to satisfactorily align and position the trailer hitch apparatus.

SUMMARY OF THE INVENTION

The present invention provides a trailer hitch viewing mirror assembly in combination with a trailer hitch apparatus including a first engageable portion on the rear of a driven vehicle and a second engageable portion on the front of a trailer vehicle, the trailer vehicle also including a vertically extending trailer jack post. The trailer hitch viewing mirror assembly is detachably mounted on the trailer jack post to provide the driver of the driven vehicle with a means of visibly and accurately aligning and positioning the first engageable portion on the driven vehicle with the second engageable portion on the trailer vehicle in the absence of any other person or device.

Briefly, the trailer hitch viewing mirror assembly comprises a convex mirror, a mallable, nonmagnetic support arm having one end thereof attached to the convex mirror, and a magnetic attachment device carried by the other end of the support arm. The magnetic attachment device provides for at least two lines of contact between it and the trailer jack post when it is continguous therewith, the lines of contact being made with the jack post along at least two separate tangents of the outside surface thereof, thereby providing at least two lines of contact force in two planes which maintain the stability of the mirror assembly in a vertical position with respect to the trailer vehicle and in a parallel position with respect to the trailer jack post. Accordingly, the driver of the driven vehicle may see at one time and all during the aligning and positioning of the driven vehicle and the trailer vehicle, both the first and second engageable portions of the trailer hitch apparatus, from a point when the distance therebetween is approximately 8 feet until alignment and correct positioning thereof is consummated. The driver of the driven vehicle is therefor allowed a reasonable distance in which to maneuver the driven vehicle so as to align and position the first engageable portion thereon with the second engageable portion on the trailer vehicle. The connecting operation may then be accomplished with only one backing procedure.

In a preferred embodiment, the convex mirror of the trailer hitch viewing mirror assembly has an inside reflecting surface radius in the range of 8 to 16 inches. Additionally, the angle between the back of the convex mirror and a vertical plane through the support arm is substantially 30°.

A preferred magnetic attachment device comprises a generaly U-shaped member the upper ends of the legs of which flare outwardly and terminate in inturned edges. The U-shaped magnetic attachment device is attached to one end of the support arm along the base thereof, and a flexible magnetic shoe is received within the U-shaped member and held therein by the inturned edges such that a portion thereof is substantially contiguous with each of the upper ends.

In a preferred embodiment the U-shaped member is formed of light gage steel to increase the holding capacity of the flexible magnetic shoe, and the flexible magnetic shoe comprises rubber bonded barium ferrite composite materials.

BRIEF DESCRIPTION OF THE DRAWING

FIG. 1 is a fragmentary right side view of a driven vehicle and a common trailer vehicle having a first and second engageable portions of a trailer hitch apparatus respectively secured thereto and having the mirror assembly of the present invention secured to the trailer jack post of the trailer vehicle.

FIG. 2 is an enlarged perspective view of the front portion of a common trailer vehicle mounting the mirror assembly of the present invention.

FIG. 3 is a side elevational view, partially in section, showing the first and second engageable portions of the trailer hitch apparatus and the mirror assembly of the present invention.

FIG. 4 is a cross sectional view taken on the line 4—4 of FIG. 3.

DESCRIPTION OF THE PREFERRED EMBODIMENT

Referring now to the drawings and in particular to FIG. 1, there is shown for purpose of illustration, a ball and socket type trailer hitch apparatus 10 for coupling a driven vehicle 12 which includes a steel ball member 16 secured to the rear bumper 18 or frame of the driven vehicle 12 having a rear window 20. The driven vehicle 12 is shown as an automobile merely for purpose of illustration and for teaching the present invention. The trailer hitch apparatus 10 also includes a steel socket member 22 attached to the tow bar or tongue 24 of the trailer vehicle 14. The socket member 22 is, of course, adapted for locking engagement with the ball member 16 in a manner well known in the art. The trailer vehicle 14 is illustrated as being of the conventional type which includes a front support assembly comprising a wheel 26 carried at the lower end of a shaft 28. The upper end of the shaft 28 is disposed within a vertically extending trailer jack post 30 secured to the tow bar or tongue 24. The shaft 28 is adjustably disposed in the jack post 30 so as to permit adjustment of the distance between the wheel 26 and the tow bar or tongue 24. Such adjustment permits leveling of the trailer vehcile 14 and provides for its disconnection from the driven vehicle 12 by elevation of the socket member 22.

It should also be noted that, a motor assembly, such as an electric jack post motor (not shown), may be mounted on top of the trailer jack post 30 and may be used in lieu of the crank 32 for adjusting the elevation of the front end of the trailer vehicle 14 and for retracting the front trailer vehicle support after the trailer vehicle 14 has been attached to the driven vehicle 12.

The mirror assembly 34 of the present invention generally comprises a convex mirror 36, a malleable, nonmagnetic support arm 38 having one end 38a thereof attached to the convex mirror 36, and a magnetic attachment device 40 carried by the other end 38b of the support arm 38. The convex mirror 36 is preferably manufactured from clear break and crack resistant plastic materials so as to protect the users against cuts or injuries which might be suffered if the mirror were made of glass and broke accidentally in handling or use. The convex mirror 36 preferably has an inside reflecting surface radius in the range of 8 to 16 inches. As will be more fully explained hereinafter, this radius allows the convex mirror to reflect a view of both the steel ball member 16 of the driven vehicle and the socket member 22 of the trailer vehicle when the distance therebetween is approximately 8 feet.

The convex mirror 36 is attached to a mirror back plate 42 in a manner well known in the art. The back plate 42 is attached to the end 38a of the mallable, nonmagnetic support arm 38 in a conventional manner, such as by two rivets 44. It has been found that the preferable angle between the back plate 42 of the convex mirror 36 and a vertical plane through the support arm 38 is substantially 30°. This provides for the most universal use of the mirror assembly 34 on most conventional trailer jack posts 30, and almost without exception will give the viewing results required without any adjustment to this angle by the driver. However, it should be emphasized that it is important that the support arm 38 be made of a mallable material so as to allow for hand bending thereof, as indicated at 38c, if this should prove to be necessary. The support arm 38 should also be made of nonmagnetic material so as not to effect the life or holding capacity of the magnetic attachment device 40.

The magnetic attachment device 40 comprises a generally U-shaped member 46 the upper ends 48a of the legs 48 of which flare outwardly and terminate in inturned edges 48b. The U-shaped member 46 is attached to the end 38b of the support arm 38 along the base thereof by means of the rivets 50. A flexible magnetic shoe 52 is received within the U-shaped member 46 and is held therein by the inturned edges 48b such that a portion thereof is substantially contiguous with each of the upper ends 48a of the legs 48. The upper ends 48a of the legs 48 may be formed by hand so that the U-shaped member 46 is universal in its application and may be attached to most conventional trailer jack posts and still provided at least two lines of contact therewith, at least one of the lines of contact being provided between the trailer jack post 30 and each portion of the flexible magnetic shoe 52 which is substantially contiguous with the upper ends 48a of the legs 48. The flexibility of the magnetic shoe 52 also aids in this adjustment, as does the base and the lower ends 48c of the legs 48, which provide a slight resiliency thus enabling the magnetic shoe 52 to be maintained within the member 46.

In a preferred embodiment, the U-shaped member 46 is formed of light gage steel so as to increase the holding capacity of the flexible magnetic shoe 52 by retaining the flux therein. While the flexible magnetic shoe 52 may be made of any flexible magnetic materials, it has been found that rubber bonded barium ferrite composite materials are the most acceptable because the material in itself has the required coefficient of friction to provide the necessary additional supporting force to hold the complete mirror assembly 34 firmly in place on the trailer jack post 30, precluding the assembly 34 from sliding down the jack post 30.

In practice, the mirror assembly 34 is preferably mounted on the trailer jack post 30 as shown in the drawings. The mirror assembly 34 may be stored within the trailer vehicle 14 or the driven vehicle 12 until such time as its use is required. As can be seen from the drawing, a site line 54 from the drivers' seat of the driven vehicle 12 through the rear window 20 allows the driver of the driven vehicle 12 to see a reflected view of both the ball member 16 on the rear bumper 18 or frame of the driven vehicle 12 and the socket member 22 on the tow bar or tongue 24 of the trailer vehicle 14 at the same time in the convex mirror 36 when the distance between the ball member 16 on the driven vehicle 12 reaches a point approximately 8 feet from the socket member 22 on the trailer vehicle 14. It is important to note that both alignment as well as positioning of the ball member 16 with respect to the socket member 22 may be accomplished because the ball member 16 and the socket member 22 are visible at all times during the backing procedure from the point of first viewing the ball member 16 and the socket member 22 at the approximate 8 feet spread until such time as proper alignment and positioning is reached and the trailer hitch apparatus 10 is connected. Accordingly, the driver of the driven vehicle 12 is allowed a reasonable distance in which to manuever the driven vehicle so as to align the ball member 16 on the driven vehicle 12 with the socket member 22 on the trailer vehicle 14 with only one backing procedure. It is important to emphasize that the driver of the driven vehicle 12 will be able to connect the driven vehicle 12 with the trailer vehicle 14 without the aid of any other person or device.

As can be seen, the present invention provides a low cost mirror assembly 34 which may be instantly installed on and removed from the trailer jack post 30 on a trailer vehicle 14 without the use of any additional parts or devices which are permanently attached to the trailer jack post. Accordingly, the mirror assembly 34 may be removed for storage to avoid damage. However, as a safety precaution, a snap chain connection (not shown) may be used in connection with the mirror assembly so that if the assembly is not removed from the jack post after the trailer hitch apparatus 10 has been engaged, it will not be lost while traveling.

The mirror assembly 34 of the present invention does not require any adjustment under ordinary use. Further, the magnetic attachment device 40 thereof is adaptable for use with most conventional trailer jack posts 30, irrespective of whether the trailer jack posts use a top or side rotating jack crank 32 or whether electric jack post motors, winches or other devices are attached to the top thereof. Additionally, the support arm may be formed by hand to circumvent any obstructions when necessary.

It is also important to note that the magnetic attachment device 40 of the mirror assembly 34 is not effected by the support arm 38, either by reducing the life of the magnetic attachment device 40 or by effecting the magnetic field there of. Additionally, the magnetic attachment device 40 is provided with a contact surface 40a which does not mar or scratch the surface to which it is attached.

What I claim is:

1. In combination with a trailer hitch apparatus including a first engageable portion on the rear of a driven vehicle and a second engageable portion on the front of a trailer vehicle, the front portion of said trailer vehicle having a vertically extending trailer jack post thereon, a trailer hitch viewing mirror assembly detachably mounted on said trailer jack post to provide the driver of said driven vehicle with a means of visibly and accurately aligning and positioning said first engageable portion on said driven vehicle with said second engageable portion on said trailer vehicle, in the absence of aid from any other person and device, which comprises:
   (a) a convex mirror;
   (b) a mallable, nonmagnetic support arm having one end thereof attached to said convex mirror; and
   (c) a magnetic attachment device carried by the other end of said support arm which provides for at least two lines of contact between said magnetic attachment device and said trailer jack post when said magnetic attachment device is contiguous therewith, said lines of contact being made with said jack post along two separate tangents of the outside surface thereof, thereby providing at least two lines of contact force in two planes which maintain the stability of the mirror assembly in a vertical position with respect to said trailer vehicle and in a parallel position with respect to said trailer jack post;

whereby said driver of said driven vehicle may see at one time and all during the aligning and positioning of said driven vehicle and said trailer vehicle both said first and second engageable portions so that a reasonable distance will be allowed in which to maneuver said driven vehicle so as to align and position said first engageable portion thereon with said second engageable portion on said trailer vehicle with only one backing procedure.

2. The trailer hitch viewing mirror assembly according to claim 1, wherein said convex mirror has an inside reflecting surface radius in the range of 8 to 16 inches.

3. The trailer hitch viewing mirror assembly according to claim 1, wherein the angle between the back of said convex mirror and a vertical plane through said support arm is substantially 30°.

4. The trailer hitch viewing mirror assembly according to claim 1, wherein said magnetic attachment device comprises a generally U-shaped member the upper ends of the legs of which flare outwardly and terminate in inturned edges, said U-shaped member being attached to said support arm along the base thereof, and a flexible magnetic shoe which is received within said U-shaped member and held therein by said inturned edges such that a portion thereof is substantially contiguous with each of said upper ends, whereby when said magnetic attachment is contiguous with said trailer jack post at least one of said lines of contact is provided between said portion of said flexible magnetic shoe contiguous with the upper end of each leg of said U-shaped member and said trailer jack post.

5. The trailer hitch viewing mirror assembly according to claim 4, wherein said U-shaped member is formed of light gage steel so as to increase the holding capacity of said flexible magnetic shoe.

6. The trailer hitch viewing mirror assembly according to claim 5, wherein said magnetic shoe comprises rubber bonded barium ferrite composite materials.

References Cited

UNITED STATES PATENTS

| | | |
|---|---|---|
| 2,353,380 | 7/1944 | Adler. |
| 2,995,983 | 8/1961 | Davis. |
| 3,295,914 | 1/1967 | Dietrick. |
| 3,332,731 | 7/1967 | Penk. |

DAVID SCHONBERG, Primary Examiner

M. J. TOKAR, Assistant Examiner

U.S. Cl. X.R.

248—476